United States Patent [19]

Lee et al.

[11] Patent Number: 5,627,467

[45] Date of Patent: May 6, 1997

[54] DEVICE FOR SENSING THE DISPLACEMENT OF WORKING MEMBERS INDUSTRIAL EQUIPMENT

[75] Inventors: Seong H. Lee; Sang T. Chung; Dong S. Lee, all of Seoul, Rep. of Korea

[73] Assignee: Samsung Heavy Industries Co., Ltd., Seoul, Rep. of Korea

[21] Appl. No.: 564,826

[22] Filed: Nov. 29, 1995

[30] Foreign Application Priority Data

Dec. 23, 1994 [KR] Rep. of Korea .................. 94-36423

[51] Int. Cl.$^6$ .................. G01B 7/30; G01D 5/20; E02F 5/14
[52] U.S. Cl. .................. 324/207.22; 37/413; 324/207.16; 324/207.25; 340/686
[58] Field of Search .................. 324/207.11, 207.13, 324/207.15, 207.16, 207.22, 207.25; 37/308, 309, 413, 414, 415; 901/35, 46; 340/685, 686

[56] References Cited

U.S. PATENT DOCUMENTS 4,277,899 7/1981 Guthoff .................. 37/413
5,083,084 1/1992 Bauer et al. .................. 324/207.25 X
5,198,763 3/1993 Konishi .................. 324/207.23

*Primary Examiner*—Gerard R. Strecker
*Attorney, Agent, or Firm*—Kenyon & Kenyon

[57] ABSTRACT

A device for sensing the displacement of working members in industrial equipment is disclosed. The above sensing device includes cheap analog inductive sensors capable of maintaining the sensing characteristics irrespective of moisture and leaking water, thereby precisely sensing the displacements of the working members. The sensor housing of the device easily fixes the analog inductive sensor by simply fitting the sensor into a mount hole formed in the housing, thereby easily changing the troubled sensor with a new one and easily focusing the sensor when initially mounting the sensor to the housing. As a pair of analog inductive sensors are mounted to both side surfaces of the working member, the sensing device of this invention also prevents the operational errors to the sensors caused by the operational vibrations of the working members while sensing the displacements of the working members.

3 Claims, 3 Drawing Sheets

DEVICE FOR SENSING THE DISPLACEMENT OF WORKING MEMBERS INDUSTRIAL EQUIPMENT

BACKGROUND OF THE INVENTION

1. Field of the Invention

The present invention relates in general to a device for sensing the displacement of working members in industrial equipment and, more particularly, to sensors for sensing the working member's angular displacement so as to control the motions of working members (boom, arm, bucket and the like) in industrial equipment such as power excavators.

2. Description of the Prior Art

As well known to those skilled in the art, various types of industrial equipment have been preferably used in construction sites and manufacturing plants for performing difficult operations which are beyond the power of man. Furthermore, not only are the buildings to be constructed and manufacturing lines of the plants run on very extensive scales, they have also been subdivided into many sections recently. Therefore, industrial equipment has been substituted for manpower while conducting difficult operations in the above construction sites and manufacturing plants.

Typical industrial equipment has a travelling part similar to that of a conventional vehicle. The travelling part moves the equipment to the desired place in the construction sites or manufacturing plants. Industrial equipment of this type also includes a plurality of working members for conducting several operations for digging sand and pebbles, digging ditches, loading goods and destroying buildings.

In the above industrial equipment, it needs to operate the working members carefully while conducting delicate operations. If an operator makes a mistake while operating the working members during a specific operation., safety accidents may occur. Power excavators are representative industrial equipment preferably used for digging. Power excavators have to be carefully controlled to accurately conduct the desired operations. In order to control the power excavators carefully, the angular displacements of the working members such as the booms, arms and buckets must be carefully controlled.

FIG. 1 is a view showing the construction of a typical power excavator. FIG. 2 is a partially enlarged perspective view of a joint portion between the boom and arm of the power excavator. The above power excavator is provided with a typical device for sensing the angular displacements of the working members.

As shown in FIG. 1, the power excavator 1 includes a turret 2 which is rotatably mounted to the top of a travelling part 3. The turret 2 forms the outer appearance of the excavator's top portion and has a control cap. The control cap is equipped with a control panel, a plurality of control levers and the like. The control levers are handled by an operator while operating the working members to conduct the desired operations. The travelling part 3 of the excavator 1 may be prodded with either wheels or caterpillars and moves the excavator to the desired place in accordance with the handling motions of the associated control levers of the control cap. The power excavator also includes a working member part 4 movably mounted to the front of the turret 2. The above working member part 4 includes a plurality of working members and directly conducts the desired operations in accordance with the handling motions of the associated control levers of the control cap.

The working members of the above part 4 include a boom 5, an arm 6 and a bucket 7 which move within their own moving ranges. The joint portions between the working members 5, 6 and 7 are each provided with a displacement sensing device 8. The sensing devices 8 of the power excavator sense the working member's angular displacements and control the motions of the working members while performing the desired operations.

FIG. 2 shows the sensing device 8 which is provided in the joint portion between the boom 5 and the arm 6 and is used for sensing the angular displacement of the arm 6 relative to the boom 5. The above sensing device 8 includes a sensor housing 9 having a predetermined configuration. The above housing 9 is mounted to the boom 5 at the joint portion between the boom 5 and the arm 6. A sensor (not shown) is received in the housing 9 and senses the angular displacement of the arm 6 relative to the boom 5. A bracket 10 is mounted to the arm 6 outside the housing 10 at the joint portion. The bracket 10 is also connected to the above housing 9.

Generally, the sensor provided in the housing 9 may use a potentiometer. When the working members of the above excavator 1 are operated to conduct the desired operation, the arm 6 will perform the arm-in or arm-out motion relative to the boom 5. The turning motion of the arm 6 rotates the housing 9 connected to the bracket 10, thereby varying the variable resistance of the sensor. The sensor thus detects the angular displacement of the arm 6 relative to the boom 5 by checking the variation of the constant voltage applied from a battery to the sensor.

As the above sensing device detects the angular displacements of the working members in accordance with constant voltage variation as described above, the device is largely influenced by moisture thereby often failing to precisely detect the angular displacements of the working members. In order to rectify the above problem, expensive waterproof sensors may be used. However, the waterproof sensors increase the cost of the displacement sensing device.

The above expensive sensor needs to be protected by the housing 9. However, the above housing 9 makes it difficult to change the sensor with a new one. Furthermore, it is very difficult to precisely focus the sensor when initially installing the sensor in the housing 9.

In addition, the sensing device vibrates intensely as the sensing device is mounted to either side surface of the working member. As the vibrations cause operational errors to the sensing device while sensing the angular displacements of the working members, the sensing device fails to precisely sense the angular displacements of the working members.

SUMMARY OF THE INVENTION

It is, therefore, an object of the present invention to provide a device for sensing the displacement of working members in industrial equipment in which the above problems can be overcome and which is provided with a cheap analog inductive sensor capable of maintaining its sensing characteristics irrespective of moisture and leaking water, thereby precisely sensing the displacements of the working members of industrial equipment.

It is another object of the present invention to provide a device for sensing the displacement of working members in industrial equipment which has a sensor housing capable of easily fixing the sensor, thereby easily changing the troubled sensor with a new one and easily focusing the sensor when initially mounting the sensor to the housing.

It is yet another object of the present invention to provide a device for sensing the displacement of working members in industrial equipment which prevents the operational errors to the sensor caused by operational vibrations of the working members while sensing the displacements of the working members.

In order to accomplish the above objects, the present invention provides a device for sensing the displacement of an industrial equipment's working member such as a boom, arm or bucket, comprising: a plurality of sensor housings mounted to both side surfaces of a support member of the working member, each housing having a sensor mount hole; a plurality of grooves formed on both side surfaces of the working member so as to face the housings while the working member moves relative to the support member, the depth of each groove varying from one end toward the other end of the groove; sensing means fixed to the sensor mount hole of each housing, the sensing means being adapted for sensing the variations of an associated groove's depth and outputting displacement data of the working member; and control means adapted for receiving the displacement data outputted from the sensing means and calculating the angular displacement of the working member relative to the support member prior to outputting a control signal to the working member in accordance with the calculated results.

In the preferred embodiment of the invention, the sensing means comprises an analog inductive sensor outputting an analog current signal in accordance with the variations of the associated groove's depth. In addition, the sensing device further includes a current/voltage converter adapted for converting the analog current signal of the analog inductive sensor into an analog voltage signal, and an analog/digital converter adapted for converting the analog voltage signal of the current/voltage converter into a digital voltage signal and outputting the digital voltage signal to the control means.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
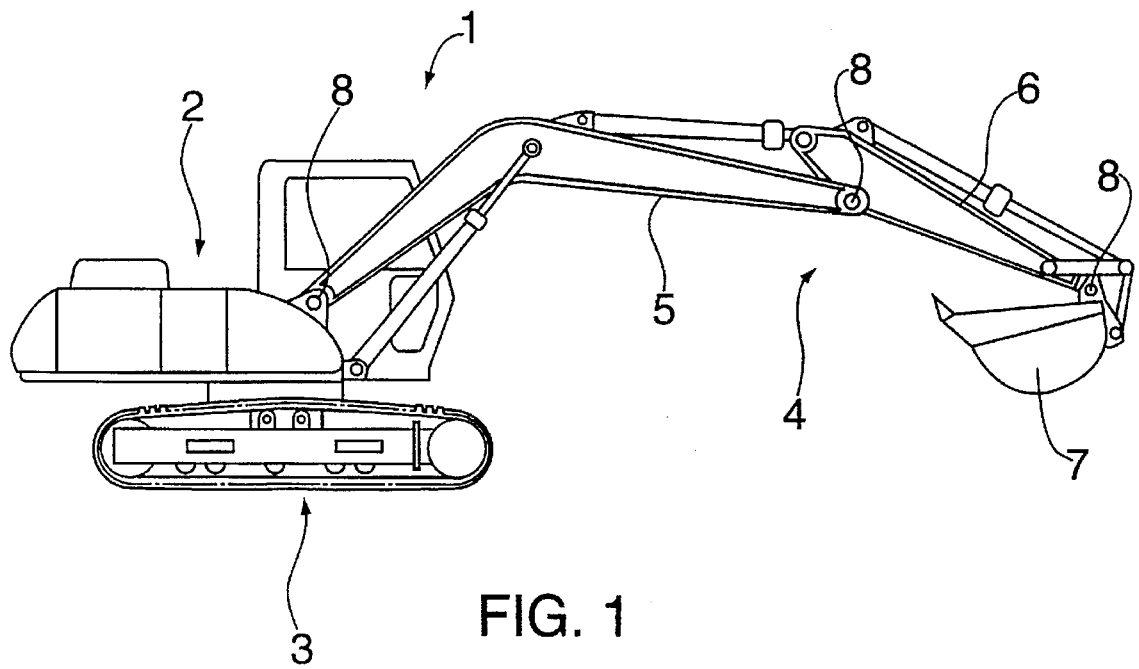
FIG. 1 is a view showing the construction of a typical power excavator.
Figure 2:
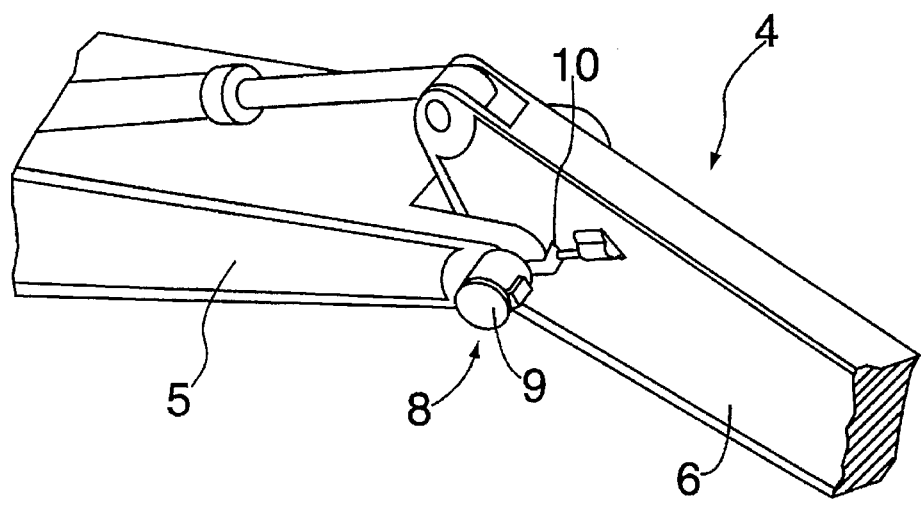
FIG. 2 is a partially enlarged perspective view of a joint portion between a boom and an arm of the power excavator with a typical sensing device for sensing the angular displacement of the arm relative to the boom.
Figure 3:
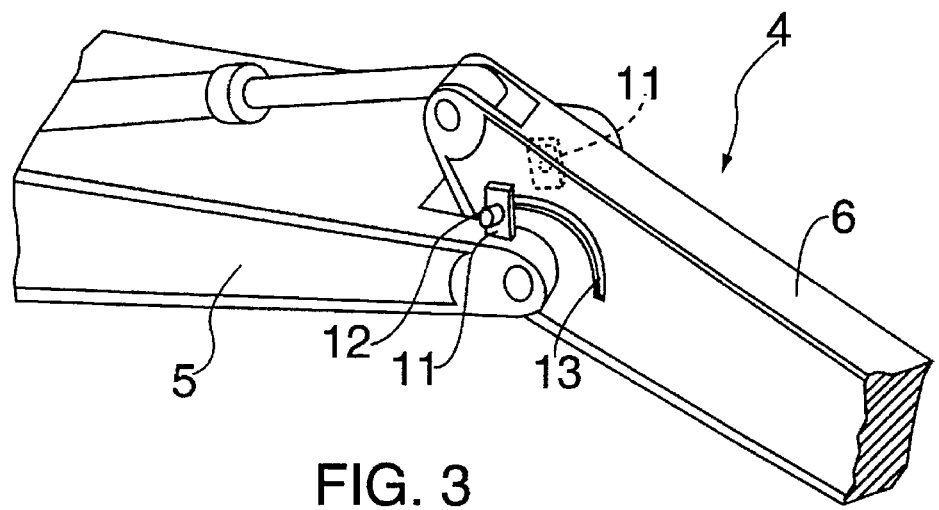
FIG. 3 is a partially enlarged perspective view of a joint portion between a boom and an arm of a power excavator with a displacement sensing device in accordance with a preferred embodiment of the present invention.
Figure 4:
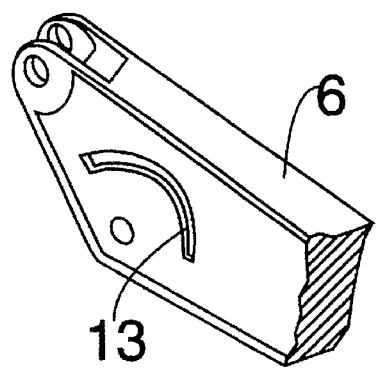
FIG. 4 is a partially enlarged perspective view of the arm of FIG. 3 provided with an arcuate groove whose depth varies from one end toward the other end.

FIG. 3 is a partially enlarged perspective view of a joint portion between a boom and an arm of a power excavator with a displacement sensing device in accordance with a preferred embodiment of the present invention. FIG. 4 is a partially enlarged perspective view of the arm of FIG. 3. In the following description, those elements common to both the present invention and the prior embodiment of FIGS. 1 and 2 will carry the same reference numerals. The above elements common to both the present invention and the prior embodiment are not described in detail in the following description.

As shown in FIG. 3, the sensing device of this invention is mounted to, for example, the joint portion between the boom 5 and the arm 6 thus sensing the angular displacement of the arm 6 relative to the boom 5. The sensing device includes a pair of sensor housings 11 which are mounted to both side surfaces of the boom 5 at the joint portion between the two working members 5 and 6. Each housing 11 is provided with a sensor mount hole. An analog inductive sensor 12 is fitted into and fixed to the sensor mount hole of each housing 11.

As best seen in FIG. 4, an arcuate groove 13 is formed on each side surface of the arm 6 at the joint portion between the two working members 5 and 6. The configuration of the arcuate grooves 13 is designed to be always faced to the analog inductive sensor 12 while the arm 6 moves relative to the boom 5. The depth of each groove 12 varies from one end toward the other end of the groove 12.

Figure 5:
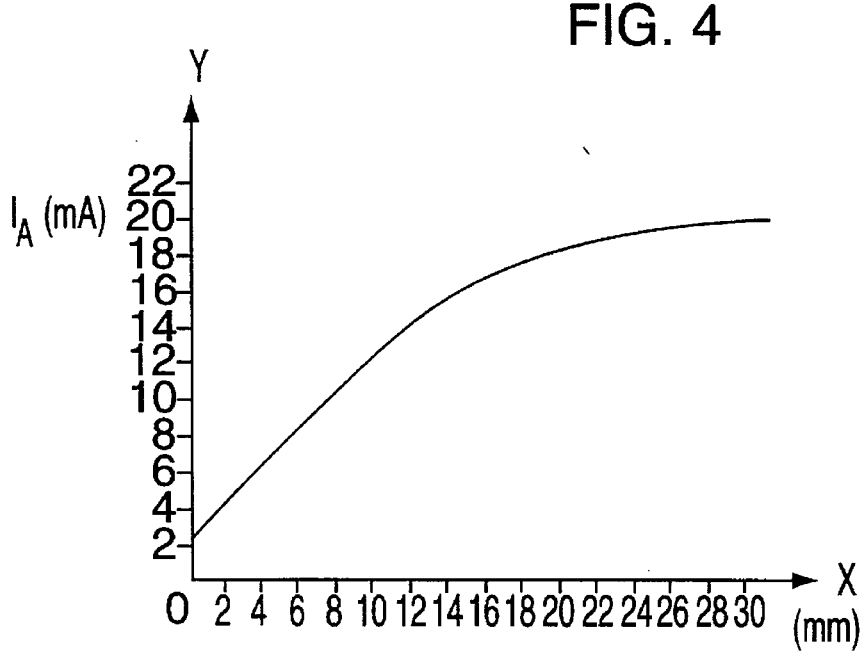
FIG. 5 is a graph showing the output characteristic of an analogue inductive sensor used in the displacement sensing device of FIG. 3.

FIG. 5 is a graph showing the output characteristic of the analog inductive sensor 12. As shown in the above graph, the analog inductive sensor 12 performs its sensing operation by the variation of the amount of electric current (Y-axis) according to the distance (X-axis), thereby maintaining its characteristic irrespective of moisture and leaking water. In accordance with the present invention, the inductive sensor 12 can be easily changed with a new one as the sensors 12 are simply fitted into the sensor mount holes of the housings 11. Of course, it will be understood that the analog inductive sensor may be substituted with other types of sensors capable of performing the sensing operation using the amount of the electric current.

The operational effect of the above-mentioned sensing device will be described hereinbelow.

Figure 6:
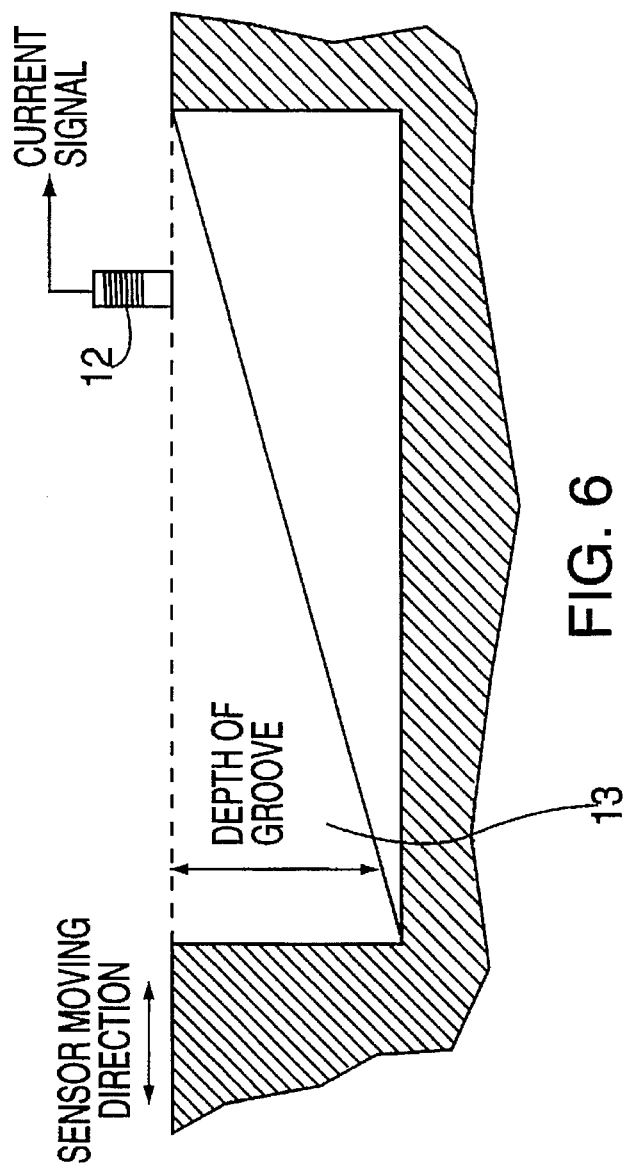
FIG. 6 is a schematic view representing the relation between the analog inductive sensor mounted to the boom and the arcuate groove formed on the arm of FIG. 3.

In the above analog inductive sensor 12, the amount of detected current varies in accordance with the distance as described above. Therefore, the amount of the electric current detected by the sensor 12 is detected in the analog type and forms an analog current signal when the depth of each arcuate groove 13 varies from one end of the groove 13 toward the other end of the groove 13 as shown in FIG. 6. The above analog current signal of the sensor 12 corresponds to the output waveform shown in FIG. 5.

Figure 7:
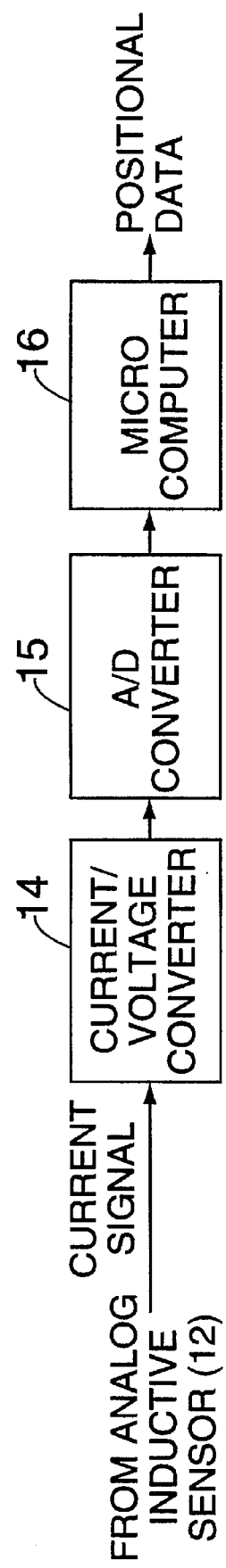
FIG. 7 is a block diagram of the process for detecting the positional data of the arm relative to the boom in accordance with the signal outputted from the analog inductive sensor of FIG. 6.

The detected analog current signal in turn is converted into an analog voltage signal by a current/voltage converter 14 as shown in FIG. 7. The analog voltage signal coming out of the converter 14 is, thereafter, converted into a digital voltage signal by an analog/digital converter 15.

The digital voltage signal coming out of the A/D converter 15 in turn is applied to a microcomputer 16. Upon receiving the above digital voltage signal, the microcomputer 16 calculates the displacement angle of the arm 6. That is, the microcomputer 16 detects the angular displacement of the arm 6 relative to the boom 5 while conducting the desired operation.

Of course, the above microcomputer 16 is provided with preset positional data according to the depth of the arcuate grooves 13. As the two analog inductive sensors 12 are fixed to the housings 11 mounted to both side surfaces of the boom 5, the microcomputer 16 calculates the average value from the positional data outputted from the above two sensors 12, thereby relatively precisely detecting the angular displacement of the arm 6 relative to the boom 5. Therefore, the sensing device of this invention remarkably reduces the operational errors to the sensors 12 caused by the operational vibrations of the excavator while sensing the displacements of the working members.

Of course, it should be understood that the sensing device of the present invention may be mounted to the joint portion between the turret 2 and boom 5 and to the joint portion between the arm 6 and bucket 7. The sensing device mounted to the joint portion between the turret 2 and boom 5 senses the angular displacement of the boom 5 relative to the turret 2. Meanwhile, the sensing device mounted to the joint portion between the arm 6 and bucket 7 senses the angular displacement of the bucket 7 relative to the arm 6. In the above description, the sensing device is used with a power excavator, for example. However, it is obvious that the sensing device of this invention may be adapted for use with other types of industrial equipment having working members.

As described above, the present invention provides a device for sensing the working member's displacements of industrial equipment. The sensing device of this invention is provided with analog inductive sensors which detect the angular displacements of the working members on the basis of current variations according to distance. Therefore, the above sensing device maintains its sensing characteristics irrespective of moisture or leaking water. As the analog inductive sensors used in the instant sensing device is remarkably cheaper than the potentiometers used in the typical sensing device, the present invention reduces the cost of the sensing devices. The analog inductive sensor is simply fitted into and fixed to the sensor mount hole of the housing, thereby being easily changed with a new one and being easily focused when initially mounting the sensor to the housing. The analog inductive sensor of this invention is also mounted to each side surface of a working member, thereby preventing an operational error to the sensor due to the operational vibrations of the working members while sensing the angular displacements of the working members.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for sensing the displacement of an industrial equipment's working member, comprising:

a plurality of sensor housings mounted on two sides of a support member of said working member, each housing having a sensor mount hole;

a plurality of grooves formed on two sides of said working member so as to face said housings while said working member moves relative to said support member, a depth of each groove varying from one end toward the other end of said groove;

sensing means fixed to the sensor mount hole of each housing, said sensing means being adapted for sensing the variations of an associated groove's depth and outputting displacement data of said working member; and control means adapted for receiving the displacement data outputted from said sensing means and calculating an angular displacement of the working member relative to the support member prior to outputting a control signal to said working member in accordance with calculating results.

2. The sensing device according to claim 1, wherein said sensing means comprises an analog inductive sensor outputting an analog current signal in accordance with the variations of the associated groove's depth.

3. The sensing device according to claim 2, further comprising:

a current/voltage converter adapted for converting the analog current signal of said analog inductive sensor into an analog voltage signal; and an analog/digital converter adapted for converting said analog voltage signal of the current/voltage converter into a digital voltage signal and outputting the digital voltage signal to said control means.

\* \* \* \* \*